United States Patent
Matsumura et al.

(10) Patent No.: US 11,685,379 B2
(45) Date of Patent: Jun. 27, 2023

(54) VEHICLE CONTROL DEVICE AND STORAGE MEDIUM STORING COMPUTER PROGRAM FOR VEHICLE CONTROL

(71) Applicant: TOYOTA JIDOSHA KABUSHIKI KAISHA, Toyota (JP)

(72) Inventors: Takeshi Matsumura, Toyota (JP); Ryosuke Machida, Tokyo (JP); Ryuta Hashimoto, Tokyo (JP); Yuki Mori, Tokyo (JP); Takamitsu Toyoura, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 17/216,984

(22) Filed: Mar. 30, 2021

(65) Prior Publication Data

US 2021/0323556 A1 Oct. 21, 2021

(30) Foreign Application Priority Data

Apr. 17, 2020 (JP) .............................. JP2020-074025

(51) Int. Cl.
*B60W 30/16* (2020.01)
*B60W 30/18* (2012.01)
(Continued)

(52) U.S. Cl.
CPC ...... *B60W 30/18163* (2013.01); *B60W 30/16* (2013.01); *B60W 50/14* (2013.01); *B60W 2554/80* (2020.02)

(58) Field of Classification Search
CPC .......... B60W 30/18163; B60W 30/16; B60W 50/14; B60W 2554/80; B60W 2050/0025;
(Continued)

(56) References Cited

U.S. PATENT DOCUMENTS

| 2014/0107867 A1* | 4/2014 | Yamashiro | ........... G05D 1/0293 701/2 |
| 2017/0203770 A1 | 7/2017 | Kondo | |

(Continued)

FOREIGN PATENT DOCUMENTS

| JP | 2016-028927 A | 3/2016 |
| JP | 2017-182521 A | 10/2017 |

(Continued)

*Primary Examiner* — Abby Y Lin
*Assistant Examiner* — Hossam M Abd El Latif
(74) *Attorney, Agent, or Firm* — Oliff PLC

(57) ABSTRACT

A vehicle control device has a processor configured to assess whether or not a lane change is necessary based on a scheduled route and surrounding environment information for a vehicle and select a traffic lane of the road, to produce a driving lane plan showing the scheduled driving lane, determine the notification priority representing the priority for notifying the driver of the planned lane change, based on at least one item from among the scheduled route, and the result of assessing whether or not the planned lane change is included in a plurality of continuous planned lane changes to be executed for a common purpose, when it has been planned to execute a lane change and suppress notification to the driver of planned lane changes with low notification priority compared to notification to the driver of planned lane changes with high notification priority, using a notification unit.

10 Claims, 11 Drawing Sheets

| 1001 | 1000 | 1002 |
|---|---|---|
| DISTANCE REQUIRED FOR EXECUTION OF LANE CHANGE | | SCORE |
| <100m | | 300 |
| ≥100m AND <500m | | 100 |
| ≥500m AND <1000m | | 50 |
| ≥1000m AND <2000m | | 30 |
| ≥2000m | | 10 |

(51) Int. Cl.
*B60W 50/00* (2006.01)
*B60W 50/14* (2020.01)
*B60W 60/00* (2020.01)

(58) Field of Classification Search
CPC ......... B60W 2420/42; B60W 2420/52; B60W 2520/10; B60W 2520/105; B60W 2520/14; B60W 60/0015; B60W 2554/802; B60W 2556/50
USPC .......................................................... 701/23
See application file for complete search history.

(56) References Cited

U.S. PATENT DOCUMENTS

| | | | |
|---|---|---|---|
| 2017/0336629 | A1 | 11/2017 | Suzuki et al. |
| 2017/0349173 | A1 | 12/2017 | Nishiguchi et al. |
| 2019/0031193 | A1 | 1/2019 | Kojima |
| 2019/0126942 | A1* | 5/2019 | Goto ..................... B60W 10/20 |
| 2019/0329779 | A1* | 10/2019 | D'sa ....................... G06N 20/20 |
| 2021/0107510 | A1* | 4/2021 | Kato ............... B60W 30/18163 |
| 2022/0118983 | A1* | 4/2022 | Yagyu ................. G06V 20/588 |

FOREIGN PATENT DOCUMENTS

| | | | |
|---|---|---|---|
| JP | 2017-200812 A | | 11/2017 |
| JP | 2017-211366 A | | 11/2017 |
| JP | 2017-217969 A | | 12/2017 |
| JP | 2018-049445 A | | 3/2018 |
| JP | 2018-055321 A | | 4/2018 |
| JP | 2020154468 A | * | 9/2020 |
| WO | 2020/003396 A1 | | 1/2020 |

* cited by examiner

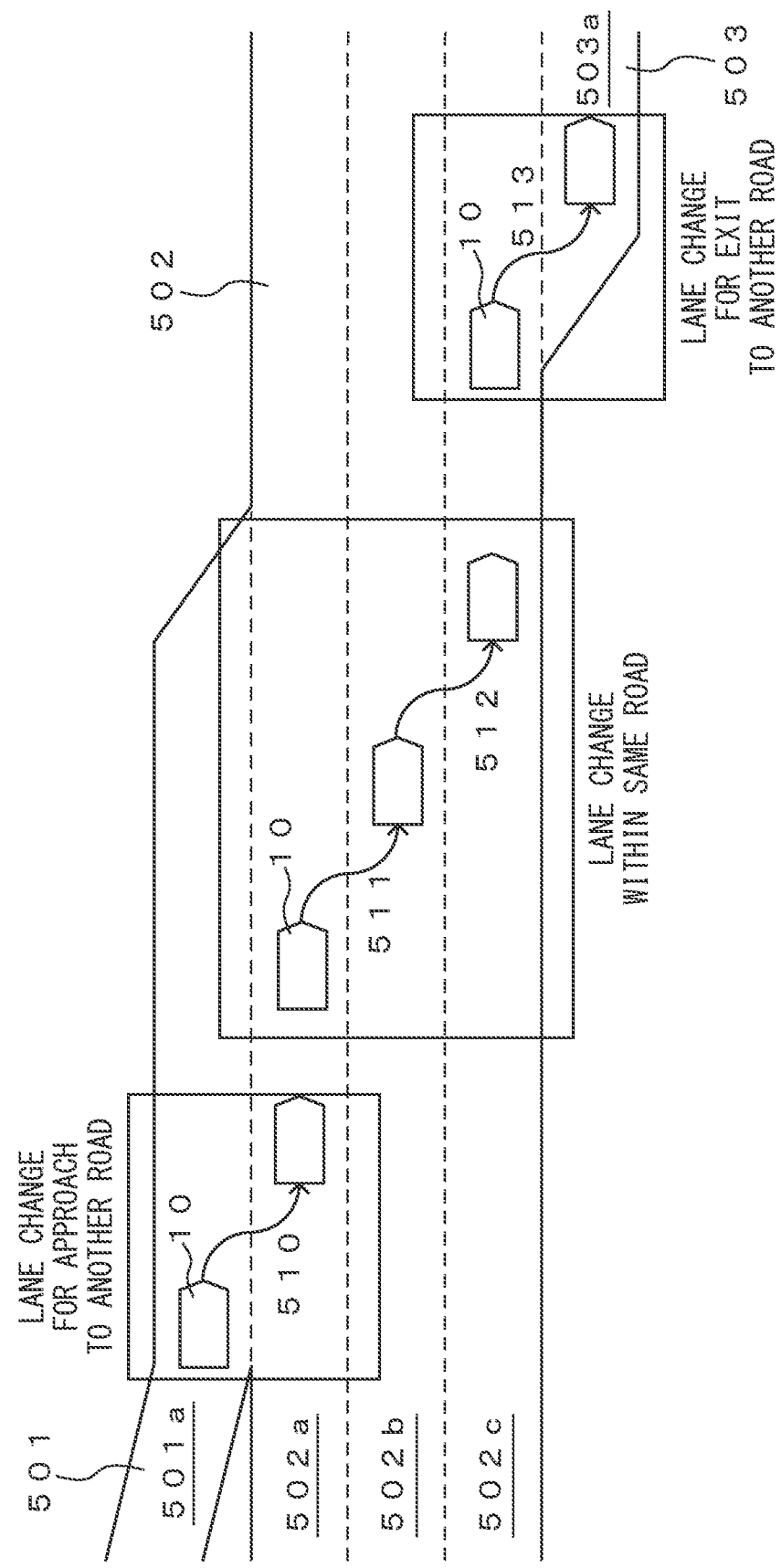

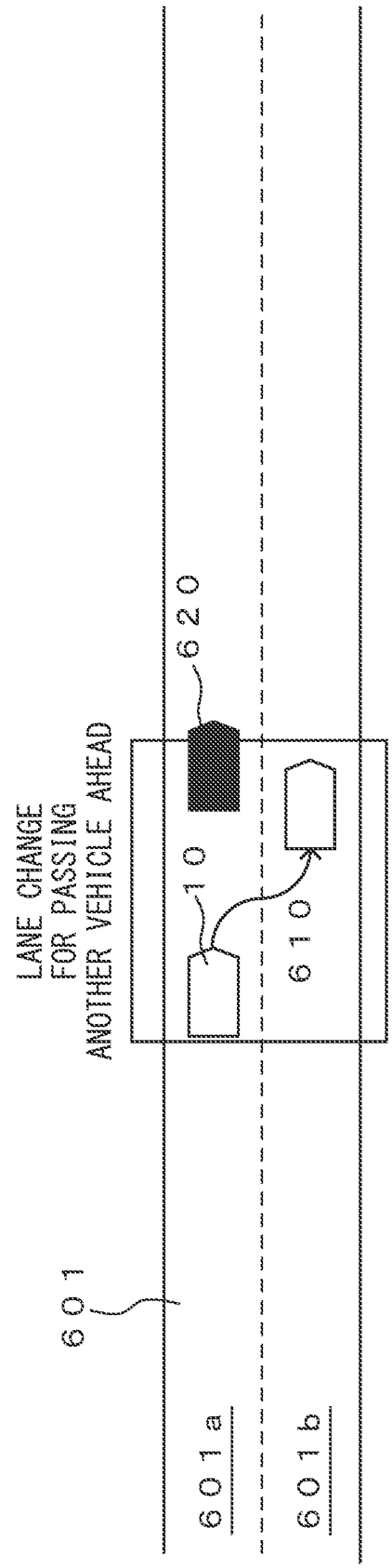

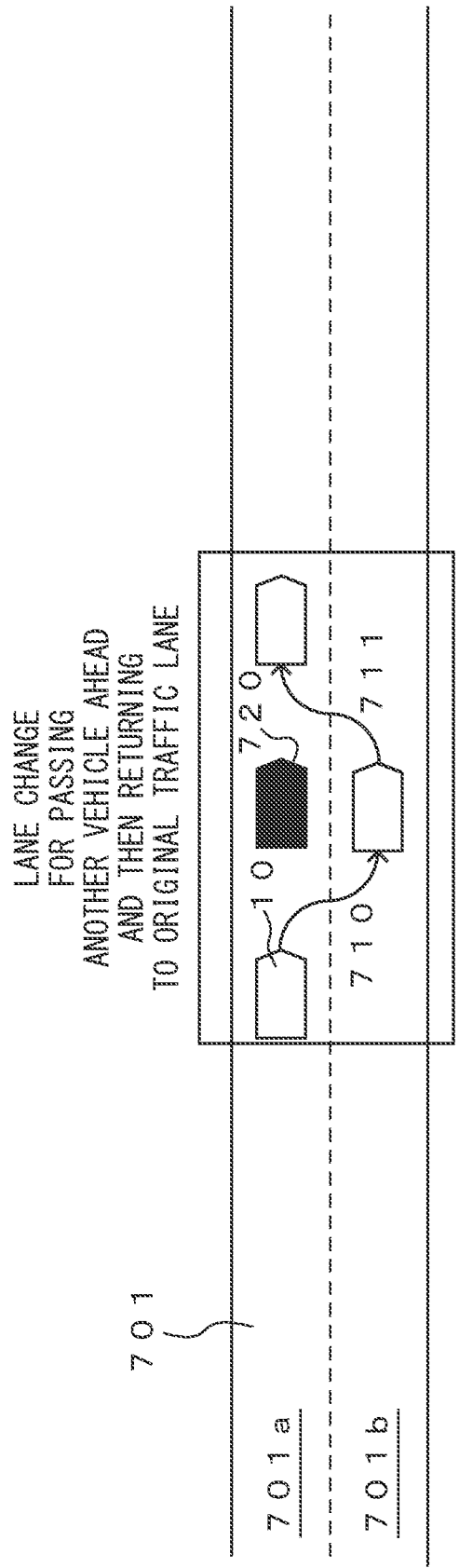

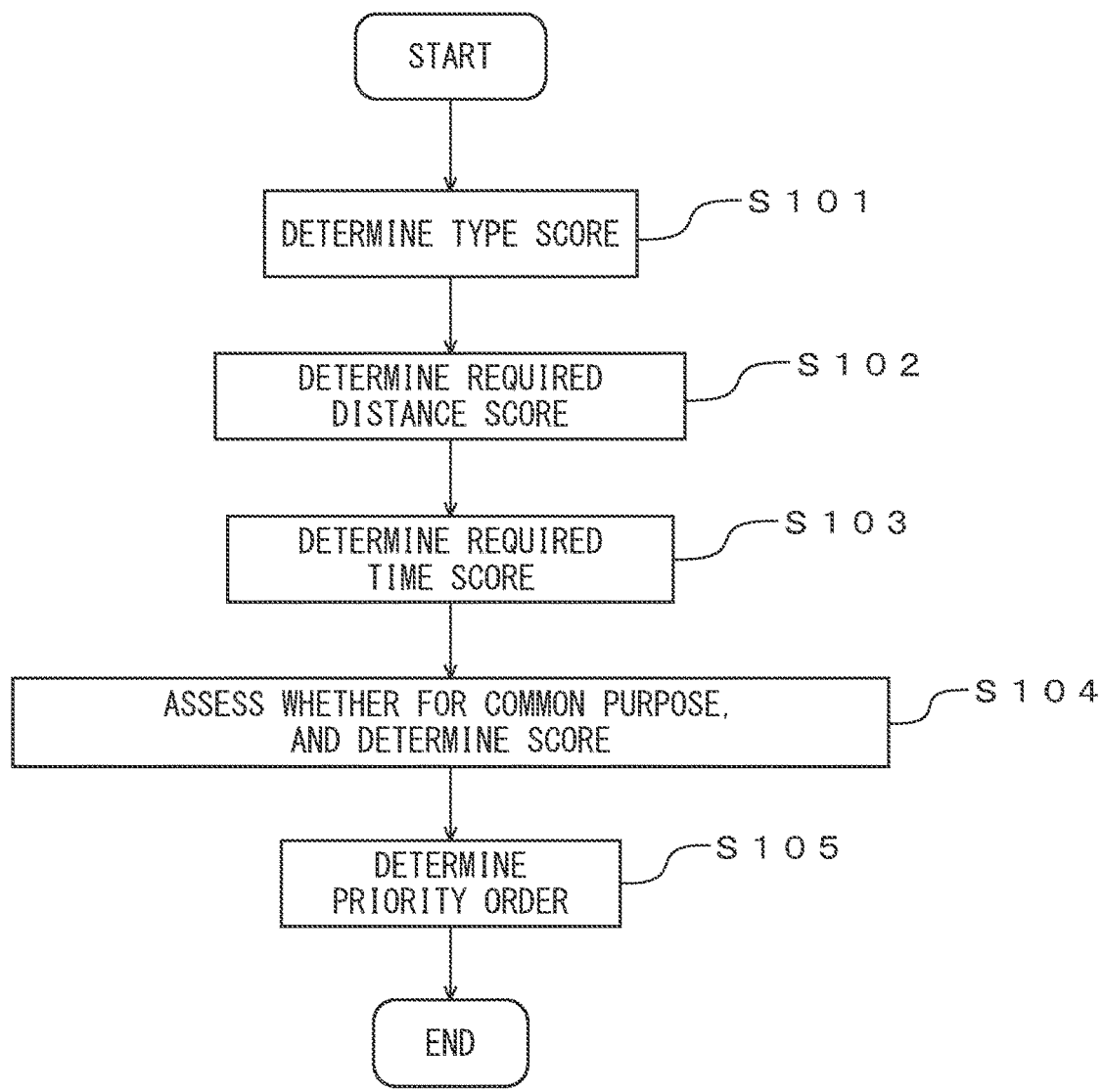

FIG. 10

| DISTANCE REQUIRED FOR EXECUTION OF LANE CHANGE | SCORE |
|---|---|
| <100m | 300 |
| ≥100m AND <500m | 100 |
| ≥500m AND <1000m | 50 |
| ≥1000m AND <2000m | 30 |
| ≥2000m | 10 |

FIG. 11

| TIME REQUIRED FOR EXECUTION OF LANE CHANGE | SCORE |
|---|---|
| <5min | 300 |
| ≥5min AND <10min | 100 |
| ≥10min AND <15min | 50 |
| ≥15min AND <20min | 30 |
| ≥20min | 10 |

FIG. 12

| INCLUDED OR NOT INCLUDED IN A PLURALITY OF CONTINUOUS PLANNED LANE CHANGES TO BE EXECUTED FOR A COMMON PURPOSE | SCORE |
|---|---|
| YES | 100 |
| NO | 0 |

VEHICLE CONTROL DEVICE AND STORAGE MEDIUM STORING COMPUTER PROGRAM FOR VEHICLE CONTROL

FIELD

The present invention relates to a vehicle control device and to a storage medium that stores a computer program for vehicle control.

BACKGROUND

Driving of a vehicle by automatic control is accomplished by creating a scheduled route for the vehicle based on the current location of the vehicle, the destination of the vehicle and map data. The vehicle is controlled to travel along the scheduled route in such a manner that safe distances are maintained between the vehicle and other vehicles (see Japanese Unexamined Patent Publication No. 2017-182521, for example).

The scheduled route may include merge zones for approach to other merging roads from the road on which the vehicle is currently traveling, branching zones for exit from the road on which the vehicle is currently traveling onto other roads that branch from that road, or road zones in which the number of traffic lanes is reduced. In such zones, the vehicle often makes a lane change to move from the currently traveling traffic lane into an adjacent lane.

The vehicle may also execute a lane change so as to avoid other vehicles traveling ahead of it, or other objects, such as obstacles.

SUMMARY

When a vehicle is scheduled to carry out a lane change it is preferred for the driver to be notified of it, but in cases of frequent lane changing, notifying the driver of every lane change that is carried out may make the driver unable to ascertain the traffic lane in which the vehicle is originally supposed to be traveling, and may also make it difficult to ascertain the scheduled route to the destination.

It is an object of the present invention to provide a vehicle control device that allows a driver to be notified of planned lane changes in an easily understandable manner.

SOLUTION TO PROBLEM

One embodiment of the invention provides a vehicle control device. The vehicle control device has a processor configured to assess whether or not a lane change is necessary based on a scheduled route and surrounding environment information for a vehicle and select a traffic lane of the road on which the vehicle is traveling, to produce a driving lane plan showing the scheduled driving lane on which the vehicle is to travel, determine the notification priority representing the priority for notifying the driver of the planned lane change, based on at least one item from among the scheduled route for the vehicle, and the result of assessing whether or not the planned lane change is included in a plurality of continuous planned lane changes to be executed for a common purpose, when it has been planned to execute a lane change and suppress notification to the driver of planned lane changes with low notification priority compared to notification to the driver of planned lane changes with high notification priority, using a notification unit that notifies the driver of information.

Also preferably, the processor is configured to assess whether or not a planned lane change is a lane change toward the destination of the vehicle, based on the scheduled route produced based on the current location of the vehicle and the destination, and when the planned lane change is not a lane change toward the destination of the vehicle, determine that the notification priority of the planned lane change is lower than the notification priority of a lane change toward the destination of the vehicle.

Also preferably, the processor is configured to calculate the distance between the location where the planned lane change is expected to be executed and the current location of the vehicle, based on the scheduled route for the vehicle, and when the distance is longer than a reference distance, determine that the notification priority of the planned lane change is lower than the notification priority of a planned lane change within the reference distance from the current location of the vehicle.

Also preferably, the processor is configured to calculate the required time estimated to be necessary until the planned lane change is executed, based on the current location of the vehicle, the vehicle speed and the scheduled route for the vehicle, and when the required time is longer than a reference time, determine that the notification priority of the planned lane change is lower than the notification priority of a lane change scheduled within the reference time from the current time.

Also preferably, the processor is configured to assess whether or not one planned lane change is included in a plurality of continuous planned lane changes to be executed for a common purpose, and when the one planned lane change is included in a plurality of continuous planned lane changes to be executed for a common purpose, determine that the notification priority for the plurality of planned lane changes that include the one planned lane change is higher than the notification priority for a planned lane change that is not included in the plurality of continuous planned lane changes to be executed for a common purpose.

Also preferably, the processor is configured to determine that the notification priority for a planned lane change generated in order to prevent the distance between the vehicle and another object from approaching within a predetermined avoidance distance, is lower than the notification priority for a planned lane change generated based on the scheduled route that includes the current location of the vehicle and the destination.

In addition, the processor suppressing notification to the driver when lane changes with low notification priority have been planned compared to when lane changes with high notification priority have been planned, preferably includes notifying the driver in a manner with reduced noticeability for causing the driver to recognize the notification, when lane changes with low notification priority have been planned compared to when lane changes with high notification priority have been planned.

In addition, the processor suppressing notification to the driver when lane changes with low notification priority have been planned compared to when lane changes with high notification priority have been planned, preferably includes not notifying the driver when lane changes with low notification priority have been planned, and notifying the driver when lane changes with high notification priority have been planned.

In addition, the processor suppressing notification to the driver when lane changes with low notification priority have been planned compared to when lane changes with high notification priority have been planned, preferably includes making the notification period for notifying the driver when lane changes with low notification priority have been planned, longer than the notification period for notifying the driver when lane changes with high notification priority have been planned.

According to another embodiment, a computer-readable non-transitory storage medium is provided that stores a computer program for vehicle control. The computer program causes a processor to assess whether or not a lane change is necessary based on a scheduled route and surrounding environment information for a vehicle and select a traffic lane of the road on which the vehicle is traveling, to produce a driving lane plan showing the scheduled driving lane on which the vehicle is to travel, determine the notification priority representing the priority for notifying the driver of the planned lane change, based on at least one item from among the scheduled route for the vehicle, and the result of assessing whether or not the planned lane change is included in a plurality of continuous planned lane changes to be executed for a common purpose, when it has been planned to execute a lane change and suppress notification to the driver of planned lane changes with low notification priority compared to notification to the driver of planned lane changes with high notification priority, using a notification unit that notifies the driver of information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a table showing examples of lane changes (1).

FIG. 6 is a table showing examples of lane changes (2).

FIG. 7 is a table showing examples of lane changes (3).

FIG. 8 is an operation flow chart for a vehicle control system that carries out priority decision processing to determine notification priority for a planned lane change.

FIG. 9 is a table showing registered relationships between lane change types and their associated scores.

FIG. 10 is a table showing registered relationships between distances required for execution of a lane change, and their associated scores.

FIG. 11 is a table showing registered relationships between times required for execution of a lane change, and their associated scores.

FIG. 12 is a table showing registered scores for the case where lane changes are for a common purpose and the case where they are not.

DESCRIPTION OF EMBODIMENTS

The vehicle control device will now be described with reference to the accompanying drawings. The vehicle control device, based on a scheduled route and surrounding environment information for a vehicle, assesses whether or not a lane change is necessary, and selects a traffic lane within the road on which the vehicle is traveling and produces a driving lane plan showing the scheduled driving lane on which the vehicle is to travel. When execution of a lane change has been planned, the vehicle control device determines the notification priority representing the priority for notifying the driver of the planned lane change, based on at least one item from among the scheduled route for the vehicle, and the result of assessing whether or not the planned lane change is included in a plurality of continuous planned lane changes to be executed for a common purpose. The vehicle control device also suppresses notification to the driver of planned lane changes with low notification priority, compared to notification to the driver of planned lane changes with high notification priority.

Figure 1:
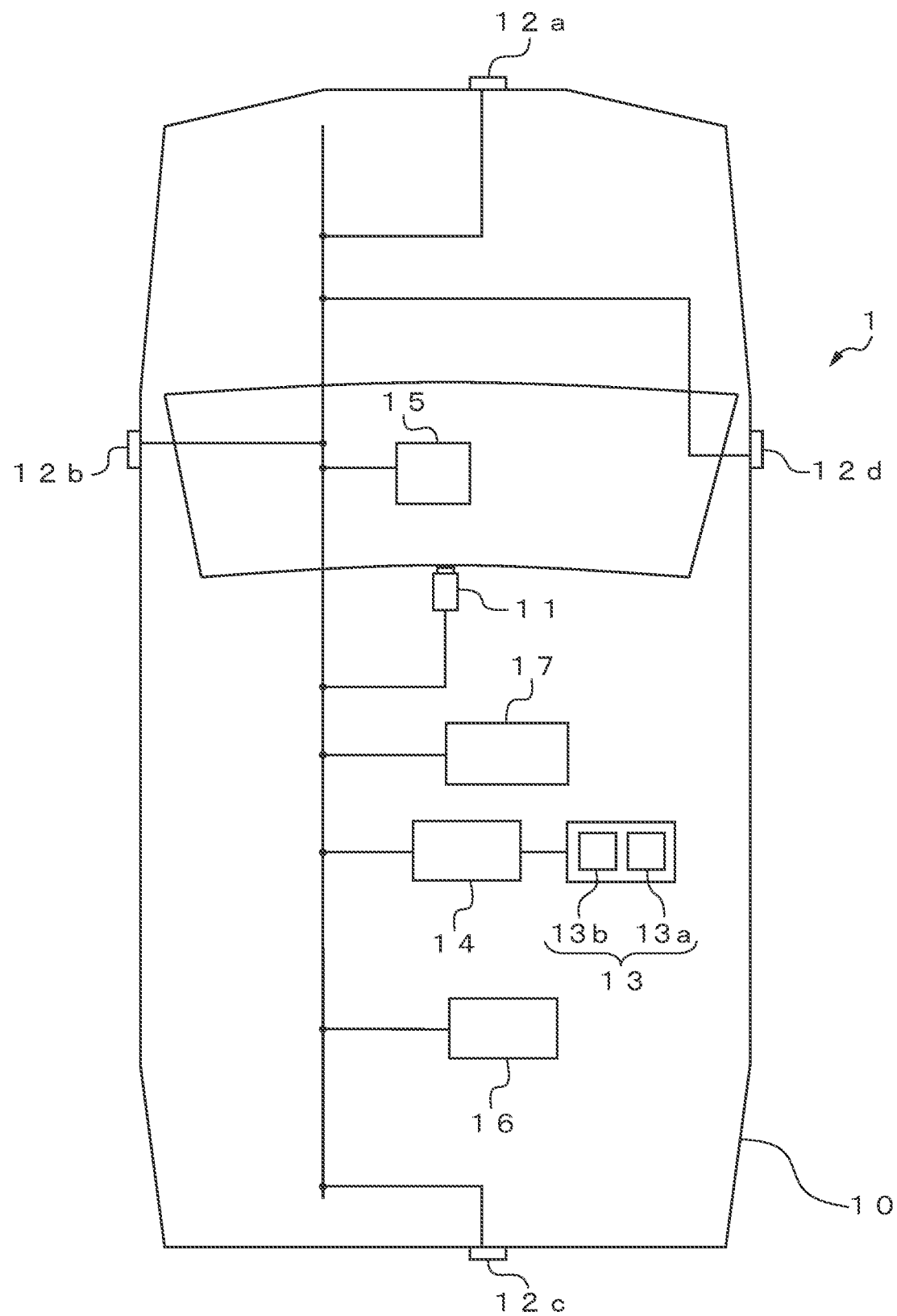
FIG. 1 is a general schematic drawing of a vehicle control system equipped with a vehicle control device.
Figure 2:
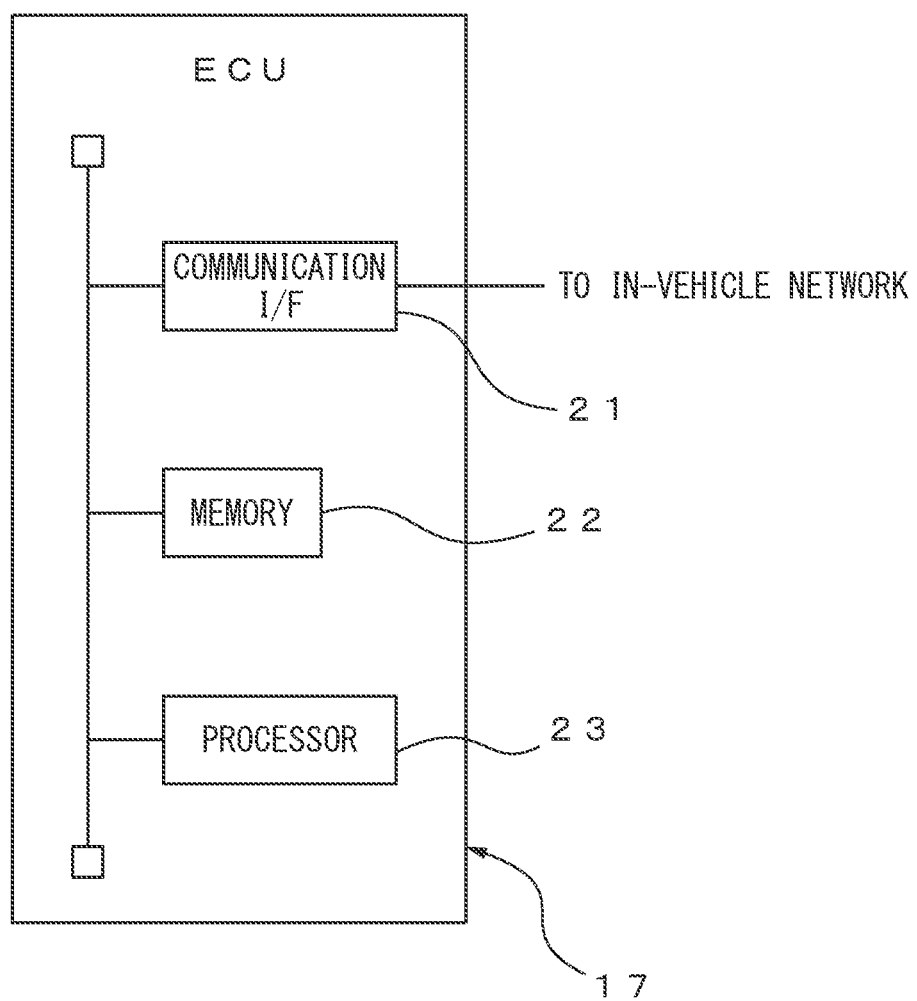
FIG. 2 is a hardware configuration diagram of an electronic control unit as an embodiment of the vehicle control device.

FIG. 1 is a general schematic drawing of a vehicle control system equipped with a vehicle control device. FIG. 2 is a hardware configuration diagram of an electronic control unit as an embodiment of the vehicle control device.

For this embodiment, the vehicle control system 1 that is mounted in the vehicle 10 and controls the vehicle 10 has a camera 11 that takes a forward image of the vehicle, and LiDAR sensors 12a to 12d situated on the front and rear and left and right sides of the vehicle 10. The vehicle control system 1 also has a positioning information receiver 13, a map information storage device 14 that produces map information based on positioning information output by the positioning information receiver 13, a user interface (UI) 15, a navigation device 16, and an electronic control unit (ECU) 17 as an example of a vehicle control device.

The camera 11, LiDAR sensors 12a to 12d, map information storage device 14, UI 15, navigation device 16 and ECU 17 are connected in a communicable manner through an in-vehicle network conforming to the Controller Area Network standard.

The camera 11 is mounted inside the compartment of the vehicle 10 and directed toward the front of the vehicle 10. The camera 11 produces an image in which a predetermined region that is ahead of the vehicle 10 is shown at an image information acquisition time set with a predetermined cycle. The image that is produced shows other vehicles around the vehicle 10, or outside features such as road surface lane marking lines that are within the predetermined region ahead of the vehicle 10. The image produced by the camera 11 may be a color image or a gray image. The camera 11 is an example of an imaging unit, and it has a 2D detector composed of an array of photoelectric conversion elements with visible light sensitivity, such as a CCD or C-MOS, and an imaging optical system that forms an image of the photographed region on the 2D detector. The camera 11 outputs the image and the image information acquisition time during which the image was produced, through the in-vehicle network, to the ECU 17 each time an image is produced. At the ECU 17, the image is used for processing to estimate the location of the vehicle, and for processing to detect any other objects around the vehicle 10.

The LiDAR sensors 12a to 12d are mounted on the outer sides of the vehicle 10, for example, being directed toward the front, the left, the rear and the right of the vehicle 10, respectively. The LiDAR sensors 12a to 12d respectively synchronize and emit a pulsed laser ahead, to the left, behind and to the right of the vehicle 10, at a reflected wave information acquisition time set with a predetermined cycle, and receive a reflected wave that has been reflected from a reflector. The time required for the reflected wave to return contains information for the distance between the vehicle 10 and outside features located in the direction in which the laser has been emitted. Each of the LiDAR sensors 12a to 12d outputs the reflected wave information that includes the laser emission direction and the time required for the reflected wave to return, together with the reflected wave information acquisition time at which the laser was emitted, through the in-vehicle network to the ECU 17. The reflected wave information is used for processing by the ECU 17 to detect other objects around the vehicle 10.

The positioning information receiver 13 outputs positioning information that represents the current location of the vehicle 10. The positioning information receiver 13 may be a GPS receiver, for example. The positioning information receiver 13 has a positioning information receiving unit 13a that receives GPS radio waves, and a processor 13b that outputs positioning information representing the current location of the vehicle 10, based on the GPS radio waves received by the positioning information receiving unit 13a. The processor 13b outputs positioning information and positioning information acquisition time at which the positioning information has been acquired, to the map information storage device 14 each time positioning information is acquired by the positioning information receiving unit 13a at a predetermined receiving cycle.

The map information storage device 14 has a processor (not shown) and a storage device (not shown) such as a magnetic disk drive or a non-volatile semiconductor memory, the storage device storing wide-area map information for a relatively wide area that includes the current location of the vehicle 10 (for example, a range of 10 to 30 square kilometers). The wide-area map information is preferably high precision map information including three-dimensional information for the road surface, information for the types and locations of structures or outside features such as road lane marking lines, and the legal speed limit for the road. The locations of road features and structures are represented by the world coordinate system, with a predetermined reference location in real space as the origin. The processor receives the wide-area map information from an external server via a base station, by wireless communication through a wireless communication device (not shown) in the vehicle control system 1, in relation to the current location of the vehicle 10, and stores it in the storage device. With reference to the wide-area map information stored in the storage device, the processor outputs the map information for a relatively narrow area including the current location represented by the positioning information (for example, an area of 100 square m to 10 square km), the positioning information and the positioning information acquisition time via the in-vehicle network to the ECU 17, each time positioning information is input from the positioning information receiver 13. The processor of the map information storage device sends positioning information and the positioning information acquisition time through the in-vehicle network to the navigation device 16, each time positioning information and a positioning information acquisition time are received from the positioning information receiver 13.

The UI 15 is an example of the notification unit. The UI 15, controlled by the ECU 17, notifies the driver of driving status information of the vehicle 10, map information, scheduled operation of the vehicle, the vehicle state, or plan for a lane change, and produces an operation signal in response to operation of the vehicle 10 by the driver. The driving status information of the vehicle 10 includes information relating to the current location of the vehicle, the scheduled route, and the current and future routes of the vehicle that includes the planned lane change. The driving status information of the vehicle 10 may also contain a driving lane plan as described below, for example. The UI 15 has a display device such as a liquid crystal display or touch panel, or an acoustic output device such as a speaker, as a notification device that notifies the driver of the driving status information, the scheduled operation of the vehicle, the vehicle state or plan for a lane change. The UI 15 also has a touch panel or operating button, for example, as an input device for accepting operation information from the driver to the vehicle 10. The operation information may be, for example, a destination, transit points, vehicle speed or other vehicle control information. The UI 15 outputs input operation information through the in-vehicle network to the ECU 17.

The navigation device 16 produces a scheduled route from the current location of the vehicle 10 to the destination, based on navigating map information, the destination of the vehicle 10 and the current location of the vehicle 10. The navigation device 16 has a memory (not shown) that stores the navigating map information, and a processor (not shown). The navigating map information includes link positional information representing the road, and positional information of nodes that are connected by the links. The road configuration on the scheduled route is represented by links representing the roads, and nodes connected by the links. The link and node locations are represented as coordinates on the world coordinate system, for example. The processor creates a scheduled route from the current location of the vehicle 10 to the destination, based on navigating map information stored in a memory, the destination of the vehicle 10 received from the UI 15, and positioning information representing the current location of the vehicle 10, received from the map information storage device 14. The processor creates a scheduled route for the vehicle 10 using the Dijkstra method, for example. The scheduled route includes information relating to the locations of right turns, left turns, merging and branching. The processor produces a new scheduled route for the vehicle 10 when a new destination has been set or when the current location of the vehicle 10 is outside of the scheduled route. The processor outputs the scheduled route through the in-vehicle network to the ECU 17 each time a scheduled route is generated.

The ECU 17 controls traveling of the vehicle 10. When execution of a lane change has been planned, the ECU 17 carries out priority decision processing to determine the notification priority representing the priority for notifying the driver of the lane change, for a planned lane change, and notification control processing whereby the UI 15 is used to suppress notification to the driver when lane changes with low notification priority have been planned compared to when lane changes with high notification priority have been planned. For this purpose, the ECU 17 has a communication interface 21, a memory 22 and a processor 23.

The communication interface (I/F) 21 is an example of a communication unit, and it has an interface circuit to connect the ECU 17 with the in-vehicle network. Specifically, the communication interface 21 is connected with the UI 15 via the in-vehicle network. The communication interface 21 is connected with the camera 11 and map information storage device 14, for example, via the in-vehicle network. When notification is received from the processor 23 of notification information indicating that a lane change is planned, the communication interface 21 sends the notification information to the UI 15. Each time an image and image information acquisition time are received from the camera 11, for example, the communication interface 21 passes the received image and image information acquisition time to the processor 23. Each time map information, positioning information and positioning information acquisition time are received from the map information storage device 14, the communication interface 21 passes the received map information, positioning information and positioning information acquisition time to the processor 23. The communication interface 21 passes the vehicle speed, acceleration and yaw rate, received from a vehicle speed sensor, acceleration sensor and yaw rate sensor (not shown), to the processor 23.

The memory 22 is an example of a memory unit, and it has a volatile semiconductor memory and a non-volatile semiconductor memory, for example. The memory 22 stores various data to be used in priority decision processing and notification control processing carried out by the processor 23 of the ECU 17, installation location information such as the optical axis direction and mounting position of the camera 11, and internal parameters such as the focal length and viewing angle of the imaging optical system. The memory 22 also stores internal parameters such as the installation locations of the LiDAR sensors 12a to 12d and their operable ranges. The memory 22 additionally stores the scheduled route received from the navigation device 16, the image and image information acquisition time received from the camera 11, and the map information, positioning information and positioning information acquisition time received from the map information storage device 14.

The processor 23 comprises one or more CPUs (Central Processing Units) and their peripheral circuits. The processor 23 may also have other computing circuits such as a logical operation unit, numerical calculation unit or graphic processing unit. When the processor 23 has multiple CPUs, it may have a separate memory for each CPU. The processor 23 carries out driving lane plan processing in which a driving lane plan is produced, and when execution of a lane change has been planned, it carries out priority decision processing to determine the notification priority for a planned lane change, and notification control processing whereby the UI 15 is used to suppress notification to the driver of planned lane changes with low notification priority, compared to notification to the driver of planned lane changes with high notification priority. The processor 23 also carries out location estimation processing whereby the location of the vehicle 10 is estimated based on the image produced by the camera 11, at the image information acquisition time when the image was produced. The processor 23 also updates the location of the vehicle 10 at a positioning time set within a predetermined cycle, using vehicle status information for the estimated location and the speed of the vehicle 10 at the latest image information acquisition time. The processor 23 also controls the running motion of the vehicle 10 based on the relative positional relationship between the estimated location of the vehicle 10, the destination of the vehicle 10 and other objects around the vehicle 10.

Figure 3:
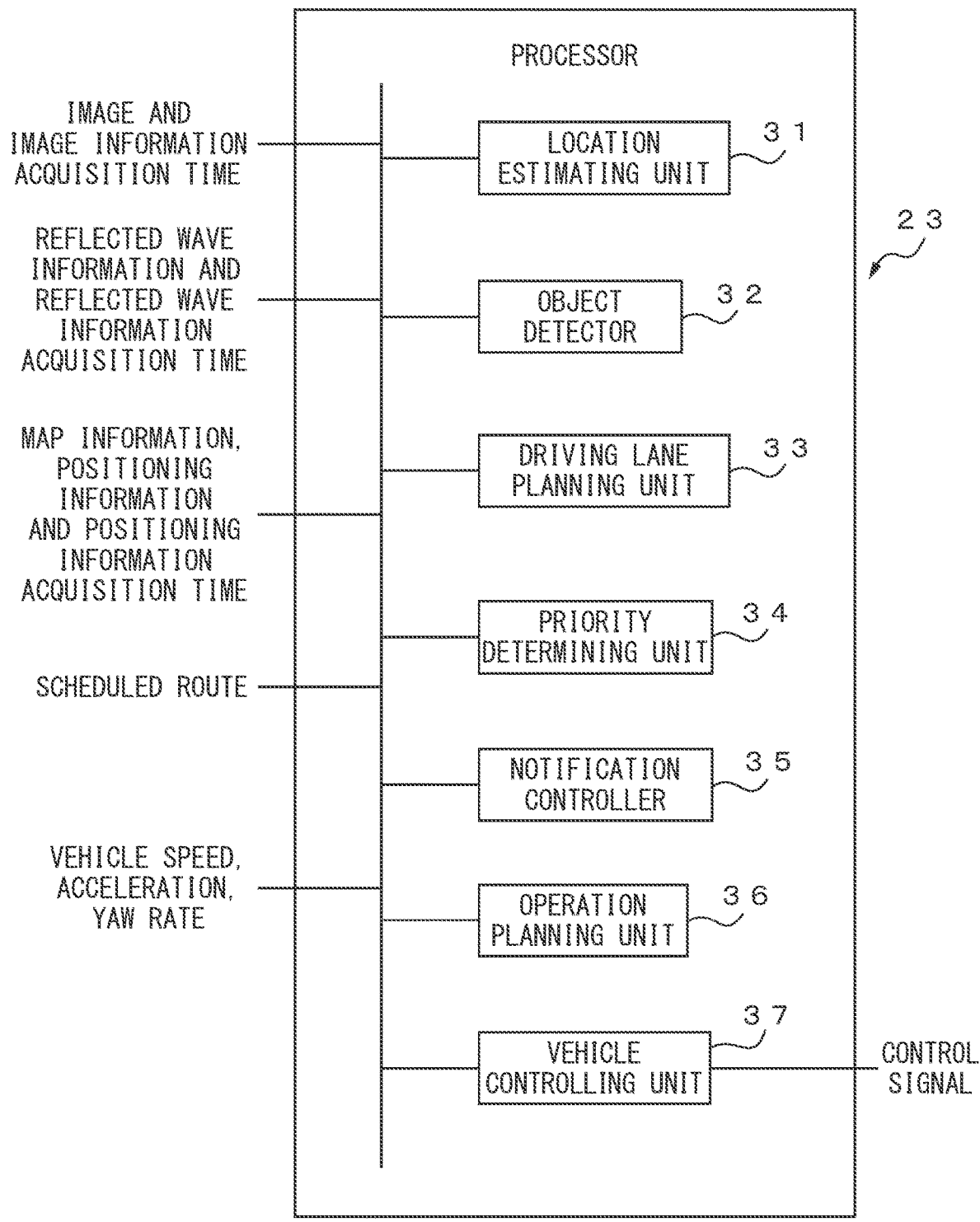
FIG. 3 is a functional block diagram of a processor of an electronic control unit, as it relates to vehicle control processing.

FIG. 3 is a functional block diagram of the processor 23 of the ECU 17, as it relates to the vehicle control processing including driving lane plan processing, priority decision processing and notification control processing. The processor 23 has a location estimating unit 31, an object detector 32, a driving lane planning unit 33, a priority determining unit 34, a notification controller 35, an operation planning unit 36, and a vehicle controlling unit 37. All or some of the units of the processor 23 are functional modules driven by a computer program operating on the processor 23, for example. Alternatively, all or some of the units of the processor 23 may be specialized computing circuits in the processor 23. Among these parts of the processor 23, the driving lane planning unit 33 carries out driving lane plan processing, the priority determining unit 34 carries out priority decision processing and the notification controller 35 carries out notification control processing.

The location estimating unit 31 of the processor 23 estimates the location of the vehicle 10 based on outside features around the vehicle 10. The location estimating unit 31 detects lane marking lines by entering a matching region for detection of lane marking lines formed in the image of the camera 11, as an example of outside features around the vehicle 10, into a discriminator that discriminates the lane marking lines in the image. The discriminator may use a deep neural network (DNN) that has been trained to detect lane marking lines represented in input images, for example. Determining an assumed location and orientation of the vehicle 10, the location estimating unit 31 projects the lane marking lines represented in the map information received from the map information-generating device 5, onto the image of the camera 11 produced at the current image information acquisition time. For example, the location estimating unit 31 determines that the assumed location and assumed orientation of the vehicle 10 are the location of the vehicle 10 represented by the positioning information received from the positioning information receiver 13 at the current image information acquisition time, and the orientation of the vehicle 10 corresponding to the traveling direction of the vehicle 10 as obtained just previously. Based on the assumed location and assumed orientation, the location estimating unit 31 determines a conversion formula from the world coordinate system to the camera coordinate system with the location of the camera 11 as the origin, and with the optical axis direction of the camera 11 as one axial direction. The conversion formula is obtained as a combination between a rotation matrix representing rotation within the coordinate system and a translation vector representing parallel movement within the coordinate system. Using the conversion formula, the location estimating unit 31 converts the coordinates of the lane marking lines on the road around the vehicle 10, which are represented in the world coordinate system and included in the map information, to coordinates in the camera coordinate system. The location estimating unit 31 projects the lane marking lines around the vehicle 10 which are represented in the camera coordinate system, onto the image of the camera 11 produced at the current image information acquisition time, based on the focal length of the camera 11 as an internal parameter of the camera 11. The location estimating unit 31 also calculates the degree of coincidence between the lane marking lines detected from the image of the camera 11 and the lane marking lines around the vehicle 10 represented on the map. The location estimating unit 31 carries out processing such as the coordinate system conversion, projection and calculation of the degree of coincidence as described above, while varying the assumed location and assumed orientation by a predetermined amount, to calculate the degree of coincidence between the lane marking lines detected in the image and the lane marking lines around the vehicle 10 represented in the map information, for each of a plurality of assumed locations and assumed orientations. The location estimating unit 31 also identifies the assumed location and assumed orientation for the maximum degree of coincidence, sets the assumed location as the estimated location of the vehicle 10, and based on that assumed orientation, determines the estimated declination representing the traveling direction of the vehicle 10.

At a positioning time set with a shorter cycle than the cycle of the image information acquisition time at which the camera 11 produces the image, the location estimating unit 31 estimates the estimated location of the vehicle 10 and the estimated declination of the vehicle 10 at the positioning time, based on the estimated location and estimated declination of the vehicle 10, estimated at the image information acquisition time immediately before that positioning time, and the amount of movement and moving direction of the vehicle 10 between the image information acquisition time and the positioning time. The location estimating unit 31 performs time-integration of the speed of the vehicle 10 to determine the amount of movement of the vehicle 10 between the image information acquisition time and positioning time, and time-integration of the yaw rate of the vehicle 10 to determine the moving direction of the vehicle 10 between the image information acquisition time and positioning time. The location estimating unit 31 estimates the road driving lane where the vehicle 10 is located, based on the map information and on the estimated location and estimated declination of the vehicle 10. The location estimating unit 31 also assesses, for example, that the vehicle 10 is traveling in a traffic lane defined by two mutually adjacent lane marking lines situated on either side of the center location of the vehicle 10 in the lateral direction. Each time the estimated location, estimated declination and driving lane of the vehicle 10 are determined at the positioning time, the location estimating unit 31 gives notification of this information to the object detector 32, driving lane planning unit 33, operation planning unit 36 and vehicle controlling unit 37. When no positioning information is available at a positioning reception time matching the image information acquisition time, the location estimating unit 31 may estimate the estimated location of the vehicle 10 and the orientation of the vehicle 10 at the image information acquisition time, based on the amount of movement and moving direction of the vehicle 10 between the image information acquisition time and the positioning reception time.

The object detector 32 of the processor 23 detects other objects around the vehicle 10, and their type, based on the image produced by the camera 11. Other objects also include other vehicles traveling around the vehicle 10. The object detector 32 detects objects represented in the image produced by the camera 11, by inputting the image into a discriminator, for example. The discriminator may use a deep neural network (DNN) that has been trained to detect objects represented in input images, for example. The object detector 32 used may also be a discriminator other than a DNN. For example, the discriminator used by the object detector 32 may be a support vector machine (SVM) that has been trained to output a confidence factor for representation of objects to be detected in the window, with the input being a feature descriptor (such as Histogram of Oriented Gradients, HOG, for example) calculated from a window set in the image. Alternatively, the object detector 32 may detect an object region by template matching between the image and a template in which an object to be detected is represented.

The object detector 32 may also detect other objects around the vehicle 10 based on reflected wave information output by the LiDAR sensors 12a to 12d. The object detector 32 may also determine the orientation of another object with respect to the vehicle 10 based on the location of the other object in the image produced by the camera 11, and may determine the distance between the other object and the vehicle 10, based on the orientation and on the reflected wave information output by the LiDAR sensors 12a to 12d. The object detector 32 estimates the location of the other object represented in a world coordinate system based on the current location of the vehicle 10, and the distance of the other object from the vehicle 10 and its orientation, for example. The object detector 32 may also track another object to be detected from an updated image, by matching other objects detected in the updated image produced by the camera 11 with objects detected in previous images, according to a tracking process based on optical flow. The object detector 32 may also calculate the trajectory of another object being tracked, based on the location of the object in an image updated from a previous image, represented in the world coordinate system. The object detector 32 can estimate the speed of another object with respect to the vehicle 10, based on changes in the location of the object over the course of time. The object detector 32 can also estimate the acceleration of another object based on changes in the location of the object over the course of time. In addition, the object detector 32 can identify the driving lane in which the other object is traveling, based on the lane marking lines represented in the map information and the location of the object. The object detector 32 also assesses, for example, whether another object is traveling in a traffic lane defined by two mutually adjacent lane marking lines situated on either side of the center location of the other object in the lateral direction. The object detector 32 notifies the driving lane planning unit 33 and operation planning unit 36 of information representing the type of other object (such as vehicle type) that was detected, information indicating its location, and also its speed, acceleration and driving lane.

At a driving lane-planning time set in a predetermined cycle, the driving lane planning unit 33 of the processor 23 assesses whether or not a lane change is necessary within the nearest driving zone (for example, 10 km) selected from the scheduled route as notified from the navigation device 16, based on the map information, the scheduled route to the destination and the surrounding environment information of the vehicle 10, and the current location of the vehicle 10, while also selecting a traffic lane on the road on which the vehicle 10 is traveling and creating a driving lane plan representing the scheduled driving lane for traveling of the vehicle 10. For example, the driving lane planning unit 33 creates a driving lane plan for the vehicle 10 to travel on a traffic lane other than a passing traffic lane. Each time a driving lane plan is created, the driving lane planning unit 33 notifies the operation planning unit 36 of the driving lane plan.

The driving lane planning unit 33 also assesses whether or not a lane change is necessary within the nearest driving zone selected from the scheduled route, based on the map information, the scheduled route and the current location of the vehicle 10. The driving lane planning unit 33 may further utilize surrounding environment information or vehicle status information for assessment of whether or not a lane change is necessary. The surrounding environment information includes the locations and speeds of other vehicles traveling around the vehicle 10. The vehicle status information includes the current location of the vehicle 10, and the vehicle speed, acceleration and traveling direction. Specifically, the driving lane planning unit 33 assesses, based on the scheduled route and the current location of the vehicle 10, whether or not there exists an event location in which at least one of the following events is occurring: the vehicle 10 is entering onto another merging road from the road on which it is currently traveling (merge), the vehicle 10 is making a right turn, the vehicle 10 is making a left turn, or the vehicle 10 is exiting from the road on which it is currently traveling to another branching road (branch). When the driving zone includes an event location, the driving lane planning unit 33 assesses whether or not a lane change is necessary. Specifically, the driving lane planning unit 33 assesses whether or not the traffic lane in which an event is to be carried out at an event location is the same as the traffic lane in which the vehicle 10 is currently traveling, and when it is different, it assesses that a lane change is necessary. When another object, such as another vehicle, exists that is traveling in the same traffic lane as the one in which the vehicle 10 is traveling, and it is predicted that the vehicle 10 and the other object will impact if the vehicle 10 continues to travel in the same traffic lane, then the driving lane planning unit 33 assesses that it is necessary to make a lane change. When the driving lane planning unit 33 assesses that a lane change is necessary, it generates a driving lane plan that includes the traffic lane before the change and the traffic lane after the change. The driving lane planning unit 33 may also use the UI 15 to notify the driver of the plan to execute the lane change. When the driving lane planning unit 33 notifies the driver that the driver is to execute a lane change, and approval has been obtained from the driver, then it may create a driving lane plan that includes the traffic lane before the change and the traffic lane after the change.

An example of processing by the driving lane planning unit 33 to create a driving lane plan will now be explained with reference to FIG. 4 which shows an approach (merge) from a road on which the vehicle 10 is currently traveling to another merging road.

Figure 4:
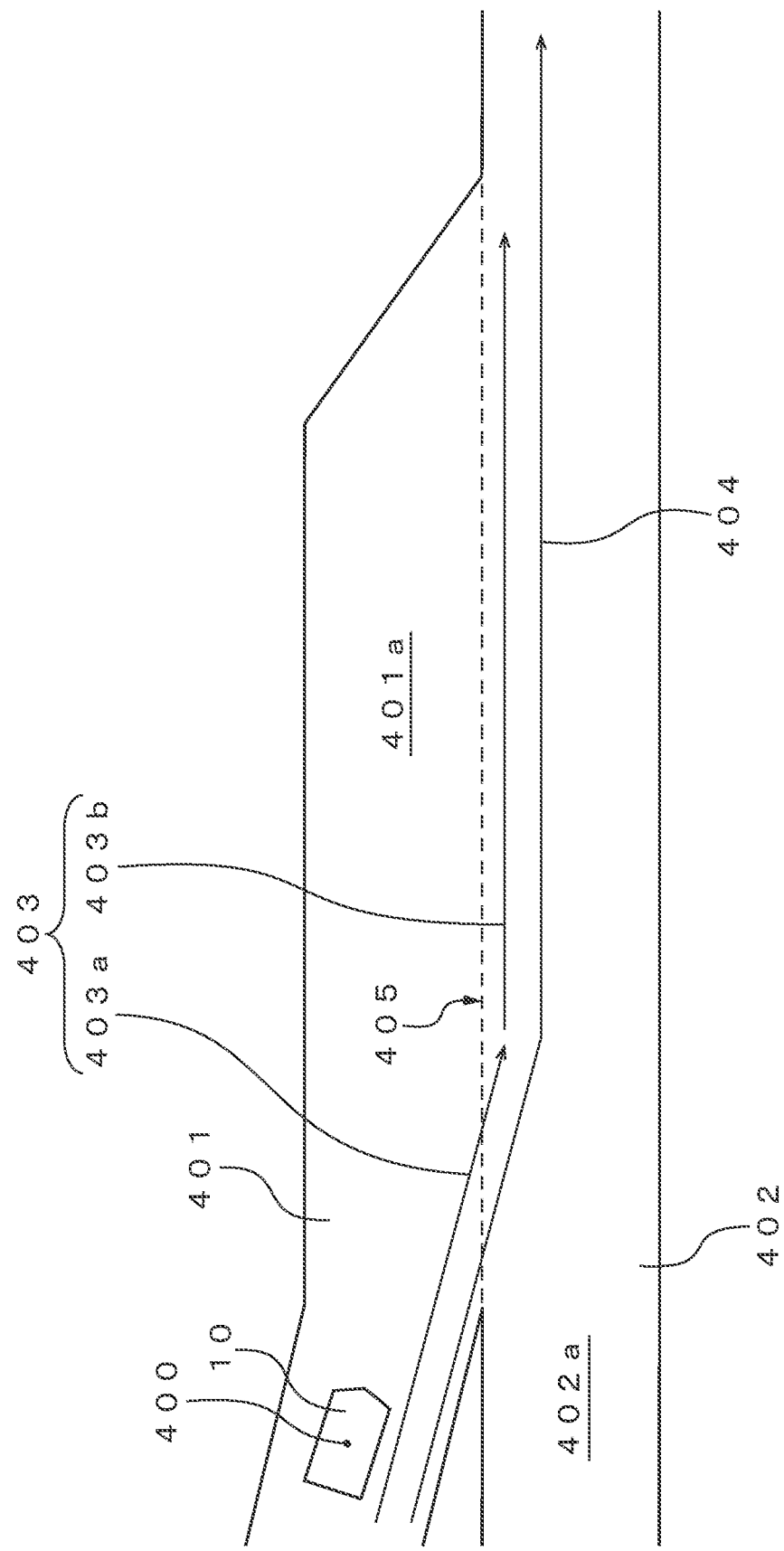
FIG. 4 is a diagram illustrating processing for creation of a driving lane plan for a merge zone.

In the example shown in FIG. 4, where the driving zone includes a merge zone that is an event location, the driving lane planning unit 33 assesses whether or not the traffic lane in which the event is to be carried out within the merge zone is the same as the traffic lane in which the vehicle 10 is currently traveling, based on the map information, the scheduled route and the current location of the vehicle 10. When the traffic lane in which the event is to be carried out within the merge zone is different from the traffic lane in which the vehicle 10 is currently traveling, the driving lane planning unit 33 assesses that it is necessary to execute a lane change. The driving lane planning unit 33 creates a driving lane plan that includes movement from the traffic lane in which the vehicle 10 is currently traveling to the traffic lane in which the event is to be carried out within the merge zone.

In the example shown in FIG. 4, the scheduled route 403 for the vehicle 10 includes a route 403a on a road 401, and a route 403b on a road 402 with which the road 401 merges. The current location 400 of the vehicle 10 is on the route 403a. The route 403b is a future route on which the vehicle 10 will travel. The current driving zone 404 includes a merge zone 405 where the road 401 on which the vehicle 10 is currently traveling merges with the other road 402. The driving lane planning unit 33 assesses that the merge zone 405, where the road 401 on which the vehicle 10 is currently traveling approaches the other merging road 402, is an event location within the driving zone 404. The driving lane planning unit 33 is notified by the location estimating unit 31 that the current location 400 of the vehicle 10 is on the traffic lane 401a. Since the driving zone 404 includes the merge zone 405, the driving lane planning unit 33 assesses whether or not a lane change is necessary. In the merge zone 405, the vehicle 10 will move from the traffic lane 401a of the road 401 on which it is currently traveling to the traffic lane 402a of the merging road 402, and therefore the driving lane planning unit 33 assesses that the traffic lane 402a where the event is to be carried out at the event location is different from the traffic lane 401a in which the vehicle 10 is currently traveling. The driving lane planning unit 33 therefore assesses that it is necessary to make a lane change from the traffic lane 401a of the currently traveling road 401 to the traffic lane 402a of the road 402. The driving lane planning unit 33 also creates a driving lane plan in the driving zone 404 that includes a lane change of the vehicle 10 from the traffic lane 401a of the road 401 to the traffic lane 502a of the road 402, before it reaches the merge zone 405.

A concrete example of a lane change that can be carried out by a vehicle 10 will now be explained with reference to FIG. 5 to FIG. 7. FIG. 5 shows (1) a lane change 510 for approach to another road, (2) a lane change 511 and lane change 512 within the same road, and (3) a lane change 513 for exiting to another road.

(1) Lane Change 510 for Approach to Another Road

This example is the same type of lane change as explained above with reference to FIG. 4. In a merge zone for approach from a road 501 currently being traveled to another merging road 502, the vehicle 10 moves from the traffic lane 501a of the road 501 to the traffic lane 502a of the road 502. The lane change 510 is a movement of the vehicle 10 between traffic lanes for the purpose of traveling from its current location toward the destination based on the scheduled route.

(2) Lane Change 511 and Lane Change 512 Within the Same Road

The vehicle 10 that has entered from the road 501 onto the road 502 carries out a lane change 511 and lane change 512 in order to exit from the road 501 that is currently being traveled to the road 503 that is branching ahead. The vehicle 10 is traveling on the traffic lane 502a of the road 502. In order to exit to the road 503 that is branching ahead, the vehicle 10 moves from the traffic lane 502a to the traffic lane 502b within the same road 502, and then moves from the traffic lane 502b to the traffic lane 502c within the same road 502. Since the lane change 511 from the traffic lane 502a to the traffic lane 502b and the lane change 512 from the traffic lane 502b to the traffic lane 502c are carried out in order to exit from the road 501 on which the vehicle 10 is currently traveling to the road 503 that is branching ahead, this forms a plurality of consecutive lane changes to be executed for a common purpose. The lane change 511 and lane change 512 are movements of the vehicle 10 between traffic lanes for the purpose of traveling from its current location toward the destination based on the scheduled route.

(3) Lane Change 513 for Exit to Another Road

In the branching zone that branches from the currently traveling road 502 to the road 503 that is branching ahead, the vehicle 10 moves from the traffic lane 502c of the road 502 to the traffic lane 503a of the road 503. The lane change 513 is a movement of the vehicle 10 between traffic lanes for the purpose of traveling from its current location toward the destination based on the scheduled route.

FIG. 6 shows a lane change 610 for passing another vehicle that is ahead. The vehicle 10 is currently traveling on the traffic lane 601a of the road 601. Ahead of the vehicle 10, the other vehicle 620 is traveling on the same traffic lane 601a, at a slower speed than the speed of the vehicle 10. The vehicle 10 moves from the traffic lane 601a to the traffic lane 601b in order to prevent the distance between the vehicle 10 and the other vehicle 620 from approaching within a predetermined distance. Since the lane change 610 is carried out to prevent the vehicle 10 from approaching the other vehicle 620, it is not a movement of the vehicle 10 between traffic lanes for the purpose of progressing from the current location toward the destination based on the scheduled route.

FIG. 7 shows a lane change 710 and a lane change 711 for passing another vehicle that is ahead, and then returning to the original traffic lane. The vehicle 10 is currently traveling on the traffic lane 701a of the road 701. Ahead of the vehicle 10, the other vehicle 720 is traveling on the same traffic lane 701a, at a slower speed than the speed of the vehicle 10. In order to prevent the distance between the vehicle 10 and the other vehicle 720 from approaching within the predetermined distance, the vehicle 10 moves from the traffic lane 701b to the traffic lane 701a so that, after it has moved from the traffic lane 701a to the traffic lane 701b and passed the other vehicle 720, it can return to the original driving lane. Since the lane change 710 from the traffic lane 701a to the traffic lane 701b and the lane change 711 from the traffic lane 701b to the traffic lane 701a are carried out in order for the vehicle 10 to pass the other vehicle 720 that is ahead and then return to the original traffic lane, this forms a plurality of consecutive lane changes to be executed for a common purpose. Moreover, since the lane change 710 and lane change 711 are carried out to prevent the vehicle 10 from approaching the other vehicle 720, it is not a movement of the vehicle 10 between traffic lanes for the purpose of progressing from the current location toward the destination based on the scheduled route.

When execution of a lane change has been planned, the priority determining unit 34 of the processor 23 determines the notification priority representing the priority for notifying the driver of the planned lane change, based on at least one item from among the scheduled route for the vehicle 10, and the result of assessing whether or not the planned lane change is included in a plurality of continuous planned lane changes to be executed for a common purpose. Specifically, the priority determining unit 34 determines the notification priority for the lane change at a priority decision time set within a predetermined cycle. The cycle for the priority decision time is preferably either the same as the cycle of the driving lane-planning time, or a length of up to less than twice the cycle of the driving lane-planning time. For each of one or more lane changes planned within a single driving zone, based on the attributes of the lane change (its type, distance required, time required, common purpose or not), the priority determining unit 34 determines a score representing the notification priority, for each attribute. Because one planned lane change can have multiple attributes, scores are determined for each attribute of a single planned lane change. The priority determining unit 34 also determines the priority order for notifying the driver of lane changes, for each of one or more lane changes planned within a single driving zone, based on the score determined for each attribute. For this embodiment, the sum of the scores determined for each of the attributes of a planned lane change is calculated, and the priority order is determined based on the summed value. The number of attributes of a lane change may be one, in which case the priority order for notifying the driver of the lane change is determined based on the value of the score for the lane change determined based on the single attribute.

FIG. 8 is an operation flow chart for a vehicle control system that carries out priority decision processing to determine notification priority for a planned lane change. First, in step S101, the priority determining unit 34 determines a score for each of one or more lane changes planned in a single driving zone, based on the type, as one attribute of the lane change. Specifically, the priority determining unit 34 determines the score for a planned lane change by referring to Table 900 shown in FIG. 9. Table 900 is stored in the memory 22, and it registers the relationship between lane change type and score. Table 900 has a type column 901 in which the types of lane changes are registered, and a score column 902 in which the lane change scores are registered. When the purpose of the lane change is to move the vehicle toward the destination, the type column 901 registers (1) a lane change for approach to another road (for example, lane change 510 of FIG. 5), (2) a lane change for exit to another road (for example, lane change 513 of FIG. 5), and (3) a lane change within the same road (for example, lane changes 511 and 512 of FIG. 5). When the purpose of the lane change is not to move the vehicle toward the destination, the type column 901 registers (1) a lane change within the same road (for example, lane change 610 of FIG. 6 or lane change 710 of FIG. 7), and (2) a lane change for movement from a passing traffic lane to a traffic lane other than a passing traffic lane (for example, lane change 711 in FIG. 7). A lane change for the purpose of progressing the vehicle toward the destination is a lane change that is planned based on the scheduled route. A lane change that is not for the purpose of progressing the vehicle toward the destination is a lane change that is planned for a purpose other than that of a lane change planned based on the scheduled route. A lane change that is not for the purpose of progressing the vehicle toward the destination can be planned based on surrounding environment information, for example. A specific example of a lane change that is not for the purpose of progressing the vehicle toward the destination is one for the purpose of preventing approach to objects such as another vehicle that is ahead, one for the purpose of moving from the driving lane to another traffic lane due to construction or other reasons, or one for the purpose of moving from a passing traffic lane to a traffic lane other than a passing traffic lane. Both when the lane change is for the purpose of progressing the vehicle toward the destination and when the lane change is not for the purpose of progressing the vehicle toward the destination, the score column 902 registers a notification priority representing the priority for notifying the driver as a numerical value (score), for each type of lane change. When the planned lane change is to be carried out for a purpose that is not for progressing the vehicle 10 toward the vehicle destination, the score column 902 registers a score for the planned lane change, which is lower than the score for a lane change that is for the purpose of progressing the vehicle 10 toward the vehicle destination. This is because a lane change that is not for the purpose of progressing the vehicle 10 toward the destination is considered to be less important for the driver to recognize than a lane change that is for the purpose of progressing the vehicle 10 toward the destination. The priority determining unit 34, referring to Table 900, determines the score for a lane change that is not for the purpose of progressing the vehicle 10 toward the destination to be lower than the score for a lane change that is for the purpose of progressing the vehicle 10 toward the destination. This allows the driver to more easily recognize when notified of a lane change that is considered to be important for the driver, while the driver will less easily recognize when notified of a lane change that is considered to be relatively non-important for the driver, thereby reducing the amount of information to be recognized by the driver and consequently helping the driver to more easily ascertain the scheduled route toward the destination. The priority determining unit 34 also determines a score for each type of lane change that is for the purpose of progressing the vehicle 10 toward the destination, and classifies it as either a lane change considered to be important for the driver or a lane change considered to be relatively non-important for the driver, thus reducing the amount of information to be recognized by the driver. Likewise, the priority determining unit 34 determines a score for each type of lane change that is not for the purpose of progressing the vehicle 10 toward the destination, and classifies it as either a lane change considered to be important for the driver or a lane change considered to be relatively non-important for the driver, thus reducing the amount of information to be recognized by the driver.

Next, in step S102, the priority determining unit 34 determines a score for each of one or more lane changes planned in a single driving zone, based on the distance required for execution of a lane change as one attribute of the lane change. Specifically, the priority determining unit 34 determines the score for a planned lane change by referring to Table 1000 shown in FIG. 10. Table 1000 is stored in the memory 22, and it registers the relationship between distance required for execution of a lane change, and score. The priority determining unit 34 calculates the required distance between the location where the planned lane change is expected to be executed and the current location of the vehicle 10, based on the scheduled route notified from the navigation device 16. The priority determining unit 34 may use the location established for each type of lane change as the location where the planned lane change is expected to be executed. For example, the priority determining unit 34 may set the location where a lane change for approach to another road is scheduled to be executed, as the initial location of the merge zone. Alternatively, the priority determining unit 34 may set the location where a lane change for exit to another road is scheduled to be executed, as the initial location of the branching zone. A location where a lane change is for the purpose of progressing toward the destination and where lane changes within the same road are scheduled to be executed, may be set as a location ahead of the initial location of the branching zone by a first predetermined distance. In the examples of the lane change 511 and lane change 512 in FIG. 5, the location where the lane change 512 is scheduled to be executed may be set as a location ahead of the initial location of the branching zone by a first predetermined distance (on the side of the current location of the vehicle 10), and the location where the lane change 511 is scheduled to be executed may be set as a location ahead of the location where the lane change 512 is scheduled to be executed, by a second predetermined distance. The priority determining unit 34 may also set a location where a lane change is not for the purpose of progressing toward the destination and lane changes within the same road are scheduled to be executed, as a location where collision with an object ahead of the vehicle 10 is estimated to occur if it continues traveling at the current vehicle speed. The priority determining unit 34 may also set a location where a lane change is not for the purpose of progressing toward the destination and the lane change is scheduled to be executed for moving from a passing traffic lane to a traffic lane other than a passing traffic lane, as a location ahead of the location generated by the lane change plan, by a third predetermined distance. Table 1000 has a distance column 1001 in which the distances required for execution of a lane change are registered, and a score column 1002 in which the lane change scores for each of the required distances are registered. The distance column 1001 registers required distances for a distance range of less than 100 m, a distance range of 100 m or greater and less than 500 m, a distance range of 500 m or greater and less than 1000 m, a distance range of 1000 m or greater and less than 2000 m, and a distance range of 2000 m or greater. The score column 1002 registers scores representing the priority for notifying the driver, for each required distance. When the required distance is longer than a predetermined reference distance, the score column 1002 registers the score for the planned lane change to be lower than the score for a planned lane change within the reference distance from the current location of the vehicle 10. This is because a lane change to be executed at a location far from the current location of the vehicle 10 is considered to be relatively less important for the driver to recognize than a lane change to be executed at a location near the current location of the vehicle 10. The priority determining unit 34, referring to the Table 1000, determines that the score for a planned lane change with a longer required distance than the predetermined reference distance, is lower than the score for a planned lane change within the reference distance from the current location of the vehicle 10. This allows the driver to more easily recognize when notified of a lane change that is considered to be important for the driver, while the driver will less easily recognize when notified of a lane change that is considered to be relatively non-important for the driver, thereby reducing the amount of information to be recognized by the driver and consequently helping the driver to more easily ascertain the scheduled route toward the destination.

Next, in step S103, the priority determining unit 34 determines a score for each of one or more lane changes planned in a single driving zone, based on the time required for execution of a lane change as one attribute of the lane change. Specifically, the priority determining unit 34 determines the score for a planned lane change by referring to Table 1100 shown in FIG. 11. Table 1100 is stored in the memory 22, and it registers the relationship between time required for execution of a lane change, and score. The priority determining unit 34 calculates required time estimated to be necessary until the planned lane change is executed, based on the current location of the vehicle 10, the speed of the vehicle 10, and the scheduled route notified from the navigation device 16. The priority determining unit 34 may also calculate the required time estimated to be necessary to reach the location where the planned lane change is to be executed, as the value of the distance between the current location of the vehicle 10 and the location where the planned lane change is expected to be executed, divided by the most recent average value for the vehicle speed. Table 1100 has a time column 1101 in which the times required for execution of a lane change are registered, and a score column 1102 in which the lane change scores for each of the required times are registered. The time column 1101 registers required times for a time range of less than 5 minutes, a time range of 5 minutes or longer and shorter than 10 minutes, a time range of 10 minutes or longer and shorter than 15 minutes, a time range of 15 minutes or longer and shorter than 20 minutes, and a time range of 20 minutes or longer. The score column 1102 registers scores representing the priority for notifying the driver, for each required time. When the required time is longer than a predetermined reference time, the score column 1102 registers the score for the planned lane change to be lower than the score for a planned lane change within the reference time from the current time. This is because a lane change to be executed in the far future from the current time is considered to be relatively less important for the driver to recognize than a lane change to be executed in the near future from the current time. The priority determining unit 34, referring to the Table 1100, determines that when the required time is longer than the predetermined reference time, the score for the planned lane change is lower than the score for a planned lane change scheduled to be executed within the reference time from the current time. This allows the driver to more easily recognize when notified of a lane change that is considered to be important for the driver, while the driver will less easily recognize when notified of a lane change that is considered to be relatively non-important for the driver, thereby reducing the amount of information to be recognized by the driver and consequently helping the driver to more easily ascertain the scheduled route toward the destination.

Next, in step S104, the priority determining unit 34 determines a score for each of one or more lane changes planned in a single driving zone, based on the result of assessing whether or not it is included in a plurality of continuous planned lane changes to be executed for a common purpose, as one attribute of the lane change. Specifically, the priority determining unit 34 determines the score for a planned lane change by referring to Table 1200 shown in FIG. 12. Table 1200 is stored in the memory 22, and it registers the relationship between classification of the assessment results for being or not being included in a plurality of continuous planned lane changes to be executed for a common purpose (Yes or No), and score. First, the priority determining unit 34 assesses whether or not one planned lane change is included in a plurality of continuous planned lane changes to be executed for a common purpose. For example, when one planned lane change is included in a plurality of consecutive planned lane changes and the reason that the plurality of planned lane changes were planned is to progress toward the destination, or to move to pass another vehicle that is ahead and then move back to the traffic lane which was being traveled in before passing, then the priority determining unit 34 assesses that the one planned lane change is included in a plurality of continuous planned lane changes to be executed for a common purpose. The Table 1200 has an assessment column 1201 in which the assessment result classifications, for either being included or not included in a plurality of continuous planned lane changes to be executed for a common purpose, are registered, and a score column 1202 in which the scores of the lane changes for each assessment result classification are registered. The score column 1202 registers a lower score for the planned lane change, when the planned lane change is not included in a plurality of continuous planned lane changes to be executed for a common purpose, than when it is included in a plurality of continuous planned lane changes to be executed for a common purpose. This is because a lane change that is not included in a plurality of continuous planned lane changes to be executed for a common purpose is executed alone, and it is therefore considered to be relatively less important for the driver to recognize than a lane change that is included in a plurality of continuous planned lane changes to be executed for a common purpose. The priority determining unit 34 determines a lower score for one planned lane change, when the planned lane change is not included in a plurality of continuous planned lane changes to be executed for a common purpose, than the score for one lane change that is included in a plurality of continuous planned lane changes to be executed for a common purpose. Thus, the priority determining unit 34 determines that the notification priority for the plurality of planned lane changes that include one planned lane change is higher than the notification priority for a planned lane change that is not included in a plurality of continuous planned lane changes to be executed for a common purpose. This allows the driver to more easily recognize when notified of a lane change that is considered to be important for the driver, while the driver will less easily recognize when notified of a lane change that is considered to be relatively non-important for the driver, thereby reducing the amount of information to be recognized by the driver and consequently helping the driver to more easily ascertain the scheduled route toward the destination. A score determined based on the result of assessing whether or not a lane change is included in a plurality of continuous planned lane changes to be executed for a common purpose, will hereunder be referred to as a "score relating to common purpose".

Figure 13:
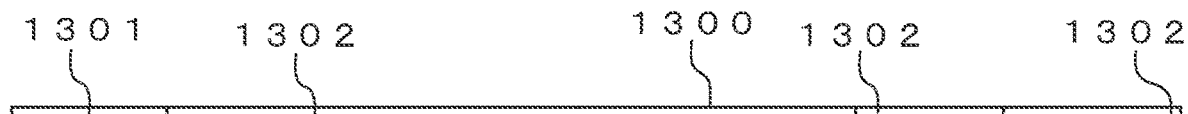
FIG. 13 is a table showing the priority order for each of a plurality of planned lane changes.

Next, in step S105, the priority determining unit 34 calculates the sum of the scores determined for each of the attributes for each of one or more lane changes planned in a single driving zone, and determines the priority order based on the sums of the scores. The priority determining unit 34 notifies the notification controller 35 of information representing the priority order and the planned lane change. FIG. 13 shows Table 1300 in which the results of the priority order determined for each of a plurality of planned lane changes is represented. In the example shown in FIG. 13, four lane changes are planned within a single driving zone at a certain time point, and the four lane changes are identified by ID Nos. 1 to 4. The lane change with ID No. 3 and the lane change with ID No. 4 are both included in a plurality of continuous planned lane changes to be executed for a common purpose. For the lane change with ID No. 1, the priority determining unit 34 calculates 270 as the sum of the type score 70, the distance score 100, the time score 100 and the score relating to a common purpose 0. For the lane change with ID No. 2, the priority determining unit 34 calculates 90 as the sum of the type score 50, the distance score 10, the time score 30 and the score relating to the common purpose 0. For the lane change with ID No. 3, the priority determining unit 34 calculates 720 as the sum of the type score 20, the distance score 300, the time score 300 and the score relating to the common purpose 100. For the lane change with ID No. 4, the priority determining unit 34 calculates 720 as the sum of the type score 20, the distance score 300, the time score 300 and the score relating to the common purpose 100. Based on the sums of the scores for the four lane changes, the priority determining unit 34 determines the priority order to be in the order: ID No. 3=ID No. 4, ID No. 1, ID No. 2. The priority determining unit 34 preferably sets the same priority order for a plurality of continuous planned lane changes to be executed for a common purpose, from the viewpoint of notifying the driver of the plurality of planned lane changes with the same level of priority. Since each of the sums of the scores for the plurality of continuous planned lane changes to be executed for a common purpose have similar required distances and required times, they will usually be the same or nearly the same values, but even if the values are different, the priority determining unit 34 still sets the same priority order for each of the plurality of continuous planned lane changes to be executed for a common purpose, allowing the driver to be notified of the lane changes in the same priority order. In the example shown in FIG. 13, the priority determining unit 34 sets the priority order for the lane changes with ID No. 3 and ID No. 4 to be priority level 1, sets the priority order for the lane change with ID No. 1 to be priority level 2, and sets the priority order for the lane change with ID No. 1 to be priority level 3. The priority determining unit 34 notifies the notification controller 35 of information representing the priority order and the planned lane change that have been set. The priority determining unit 34 may also calculate the sums of the scores based on Table 900 to Table 1200, as explained above. The priority determining unit 34 may also calculate the sums of the scores by referring to a preconstructed score calculating table that shows the relationships between the 5×5×5×2=250 different combinations and score sums, based on the lane change types (5), the required distances (5), the required times (5), and the results of assessing whether or not the lane change is included in a plurality of continuous planned lane changes to be executed for a common purpose (2).

The notification controller 35 of the processor 23 uses the UI 15 to suppress notification to the driver when a lane change with low priority order (an example of a notification priority) has been planned, compared to when a lane change with high priority order (an example of a notification priority) has been planned. Specifically, the notification controller 35 notifies the driver that a lane change has been planned at a notification time set within a predetermined cycle. The cycle for the notification time is preferably either the same as the cycle of the priority decision time, or a length of up to less than twice the cycle of the priority decision time. The notification controller 35 sends notification information representing each of a plurality of planned lane changes to the UI 15, and using the UI 15, notifies the driver that a lane change with low priority order has been planned, in a manner with reduced noticeability for causing the driver to recognize the notification, than when notifying that a lane change with high priority order has been planned. For example, the notification controller 35 may use the UI 15 to display smaller sizes for the characters or graphics representing the planned lane change, for cases of lower priority order. In the example shown in FIG. 13, the notification controller 35 uses the UI 15 to display each of the lane changes with ID Nos. 1 to 4 at the locations of their execution on the scheduled route, with smaller sizes of the characters or graphics representing the planned lane changes for lower priority order levels. The notification controller 35 may also use the UI 15 to display shapes for characters or graphics representing planned lane changes (for example, character fonts or outline apices of graphics), in a manner with reduced noticeability for lower priority order. The notification controller 35 may also use sans-serif typeface with high noticeability, and serif typeface with low noticeability. The notification controller 35 may use graphics with polygonal outlines (such as quadrilaterals or hexagons) as the shapes of graphics with high noticeability, and graphics with curved outlines (such as circles or ellipses) as characters with low noticeability. The notification controller 35 may also use the UI 15 to display the characters or graphics representing the planned lane change for a shorter display time, for cases of lower priority order. In addition, the notification controller 35 may use the UI 15 to output sound information representing the planned lane change, with a lower sound volume for cases of lower priority order. The notification controller 35 may also use the UI 15 to output sound information representing the planned lane change, with less noticeable wording for cases of lower priority order. For example, the notification controller 35 may use somewhat ambiguous expressions such as "A lane change is scheduled", as wording with low noticeability, and may use a clearer expression such as "Now making a lane change", as wording with high noticeability.

At an operation plan creation time set with a predetermined cycle, the operation planning unit 36 creates an operation plan of the vehicle 10 up until a predetermined time (for example, 5 seconds), based on the map information, the driving lane plan, the current location of the vehicle 10, the surrounding environment information and the vehicle status information. The operation plan is represented as a combination of the target location of the vehicle 10 and the target vehicle speed at the target location, at each time from the current time until the predetermined time. The cycle for the operation plan creation time is preferably shorter than the cycle for the driving lane-planning time. The operation planning unit 36 may determine the target vehicle speed based on a vehicle speed input by the driver or on the legal speed limit for the traffic lane in which it is traveling. The operation planning unit 36 notifies the vehicle controlling unit 37 of the operation plan for each operation plan created. The operation planning unit 36 uses a prediction filter such as a Kalman filter to estimate future trajectories based on the most recent trajectories of other detected vehicles and, based on relative distances calculated from the traffic lanes on which the other detected vehicles are traveling, and their estimated trajectories, it creates an operation plan for the vehicle 10 so that the relative distances from the vehicle 10 to the other vehicles are at least a predetermined distance, and so that operation of the vehicle 10 satisfies the predetermined constraints. The predetermined constraints may be upper limits for change in speed per unit time, change in acceleration per unit time, or change in yaw rate per unit time. The operation planning unit 36 may also create several operation plans based on the driving lane plan. In this case, the operation planning unit 36 may select the operation plan among the multiple operation plans that minimizes the sum of absolute accelerations for the vehicle 10. The operation planning unit 36 notifies the vehicle controlling unit 37 of the operation plan.

When the driving lane plan includes a lane change whereby the vehicle 10 is to move between traffic lanes, the operation planning unit 36 decides on one or more target locations as destinations after a lane change for movement to a traffic lane adjacent to the traffic lane in which it is currently traveling, as destination traffic lanes. The operation planning unit 36 generates an operation plan as a combination of target merge locations for the vehicle 10 and target vehicle speeds for the target merge locations, so that it is toward the one or more target locations, and so that the relative distances from the vehicle 10 to other vehicles are at least a predetermined distance. The operation planning unit 36 assesses that the lane change can be executed when it is possible to create an operation plan wherein the relative distances between the vehicle 10 and other vehicles are at least the predetermined distance and operation of the vehicle 10 satisfies the predetermined constraints. When it has been assessed that a lane change can be executed, the operation planning unit 36 notifies the vehicle controlling unit 37 of the operation plan.

When the driving lane plan does not include a lane change, the operation planning unit 36 creates an operation plan for the vehicle 10 so that it continues to travel in the currently traveling traffic lane.

The vehicle controlling unit 37 controls each unit of the vehicle 10 based on the location of the vehicle 10 at the positioning time and the vehicle speed and yaw rate, as well as on the notified operation plan (including the lane change plan), so that the vehicle 10 travels along the notified scheduled route. For example, the vehicle controlling unit 37 determines the steering angle, acceleration and angular acceleration of the vehicle 10 according to the notified operation plan and the current vehicle speed and yaw rate of the vehicle 10, and sets the amount of steering, and the accelerator level, the shift location or the brake level, so as to match that steering angle, acceleration and angular acceleration. The vehicle controlling unit 37 also outputs a control signal corresponding to a set steering amount, to an actuator (not shown) that controls the steering wheel for the vehicle 10. The vehicle controlling unit 37 also determines the amount of fuel injection according to a set accelerator level, and outputs a control signal corresponding to the amount of fuel injection to a drive unit (not shown) of the engine of the vehicle 10. Alternatively, the vehicle controlling unit 37 may output a control signal corresponding to a set brake level to the brake (not shown) of the vehicle 10.

When the operation plan includes a combination of a target trajectory and target vehicle speed for a lane change, the vehicle controlling unit 37 initiates steering of the steering wheel of the vehicle 10 and controls its running motion, so that a lane change is executed.

Figure 14:
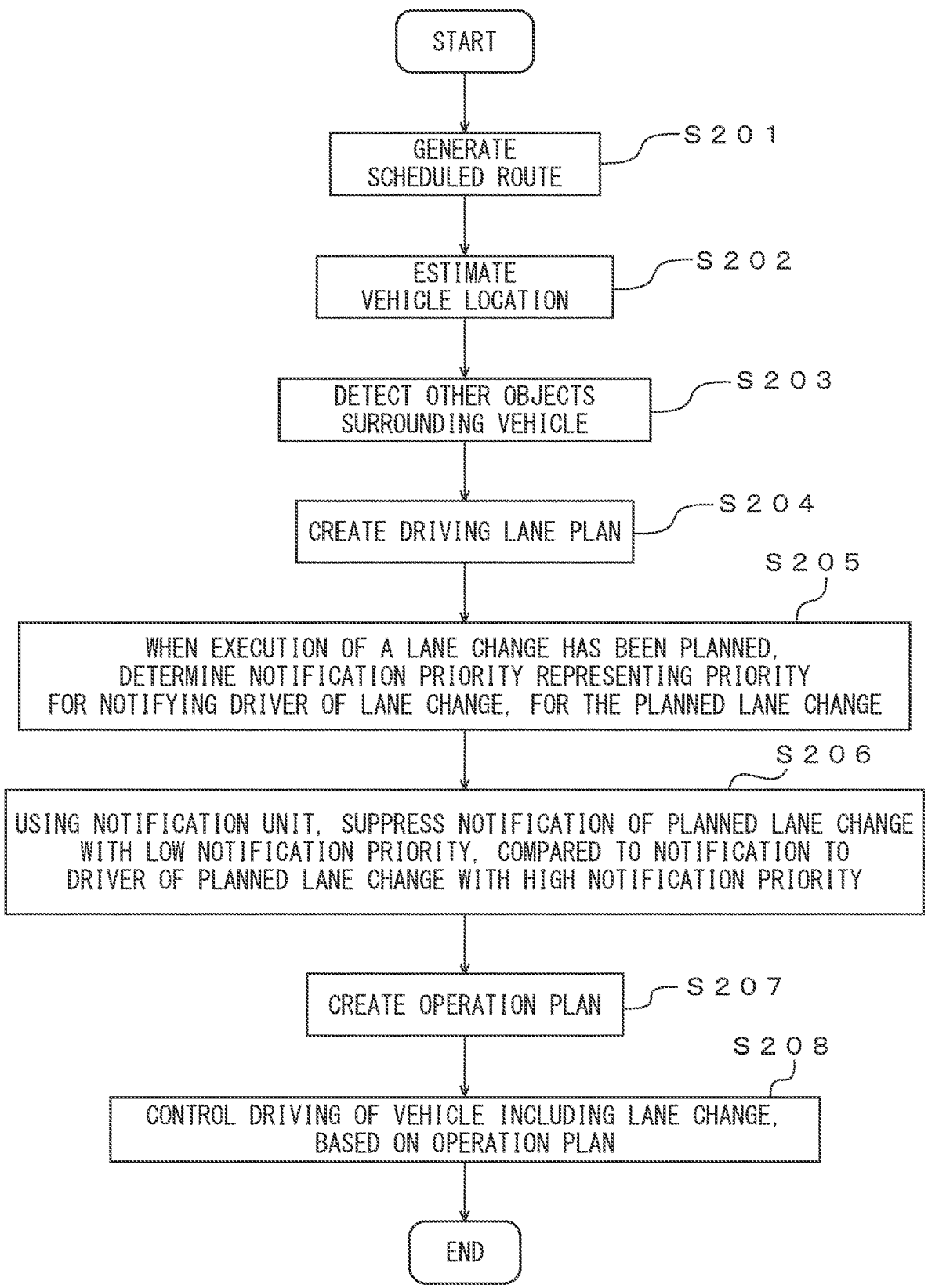
FIG. 14 is an operation flow chart for a vehicle control system, which includes vehicle control processing.

FIG. 14 is an operation flow chart for vehicle control processing that includes priority decision processing and notification control processing, carried out by the processor 23. In the operation flow chart shown below, the processing of steps S205 and S206 corresponds to the standby time determination processing.

First, the navigation device 16 produces a scheduled route from the current location of the vehicle 10 to the destination, based on navigating map information, the destination of the vehicle 10 and the current location of the vehicle 10 (step S201).

The location estimating unit 31 of the processor 23 then determines the estimated location and estimated declination of the vehicle 10 for each positioning time (step S202).

Next, the object detector 32 of the processor 23 detects other objects around the vehicle 10 based on an image produced by the camera 11 and on reflected wave information generated by the LiDAR sensors 12*a* to 12*d* (step S203).

The driving lane planning unit 33 of the processor 23, based on the scheduled route and surrounding environment information for the vehicle 10, assesses whether or not a lane change is necessary, selects a traffic lane within the road on which the vehicle 10 is traveling, and produces a driving lane plan showing the scheduled driving lane on which the vehicle 10 is to travel (step S204).

When execution of a lane change has been planned, the priority determining unit 34 of the processor 23 then determines the notification priority representing the priority for notifying the driver of the planned lane change, based on at least one item from among the scheduled route for the vehicle 10, and the result of assessing whether or not the planned lane change is included in a plurality of continuous planned lane changes to be executed for a common purpose (step S205).

Using the notification unit, the notification controller 35 of the processor 23 then suppresses notification to the driver of planned lane changes with low notification priority, compared to notification to the driver of planned lane changes with high notification priority. (Step S206).

The operation planning unit 36 of the processor 23 then creates an operation plan for the vehicle 10 up to a predetermined time, at the operation plan creation time set within a predetermined cycle (step S207).

The vehicle controlling unit 37 of the processor 23 subsequently controls traveling of the vehicle to include the lane change, based on the operation plan (step S208).

The vehicle control device, based on a scheduled route and surrounding environment information for a vehicle, assesses whether or not a lane change is necessary, and selects a traffic lane within the road on which the vehicle is traveling and produces a driving lane plan showing the scheduled driving lane on which the vehicle is to travel, in the manner described above. When execution of a lane change has been planned, the vehicle control device determines the notification priority representing the priority for notifying the driver of the planned lane change, based on at least one item from among the scheduled route for the vehicle, and the result of assessing whether or not the planned lane change is included in a plurality of continuous planned lane changes to be executed for a common purpose. The vehicle control device also suppresses notification to the driver of planned lane changes with low notification priority, compared to notification to the driver of planned lane changes with high notification priority. This will allow the driver to more easily recognize when notified of a lane change that is considered to be important for the driver, while the driver will less easily recognize when notified of a lane change that is considered to be relatively non-important for the driver, thereby reducing the amount of information to be recognized by the driver and consequently helping the driver to more easily ascertain the scheduled route toward the destination. The vehicle control device of the present invention thus allows a driver to be notified of planned lane changes in an easily understandable manner.

First and second modified examples of the embodiment described above will now be explained. In the first modified example, the notification controller 34 does not notify the driver when a lane change with low notification priority has been planned, but only notifies the driver using the UI 15 when a lane change with high notification priority has been planned. In the example shown in FIG. 13, the design may be such that the notification controller 34 does not notify the driver in the case of a lane change with a total score that is lower than a predetermined reference value (for example, 200), notifying the driver only in the case of a lane change with a total score that is higher than a predetermined reference value (for example, 200).

In the second modified example, the notification controller 34 makes the notification period longer for notifying the driver when a lane change with low notification priority has been planned, than the notification period for notifying the driver when a lane change with high notification priority has been planned. In the example shown in FIG. 13, the design may be such that the notification controller 34 sets a first period as the notification period for notifying the driver of a lane change with a total score that is lower than a predetermined reference value (for example, 200), and a second period which is shorter than the first period, as the notification period for notifying the driver of a lane change with a total score that is higher than a predetermined reference value (for example, 200).

The vehicle control device according to the embodiment described above may incorporate appropriate modifications that are still within the gist of the invention. Moreover, the technical scope of the invention is not limited to this embodiment, and includes the invention and its equivalents as laid out in the Claims.

For the purpose of the invention, the types of lane changes that can be planned are not limited to those mentioned above. The lane changes that can be planned may also include other types. The lane change attributes are also not limited to those mentioned above. Other lane change-related information may also be used as lane change attributes.

For the embodiment described above, the priority order was determined based on the sums of the scores determined for each of the attributes of a planned lane change, but determination of the priority order is not limited to this example. For example, the product of the scores determined for each of the attributes may be calculated and the priority order determined based on the size of the product. Specifically, the score for the time required for execution of a lane change may be weighted, calculating the product between it and the score for each type, and the priority order determined based on the size of the product. The priority order can be determined in such a manner that a longer required time corresponds to a lower priority order. Alternatively, the cumulative sum may be calculated as the sum of the products for the scores determined for each of the attributes, and the priority order determined based on the size of the cumulative sum.

The invention claimed is:

1. A vehicle control device comprising a processor configured to
   assess whether or not a lane change is necessary based on a scheduled route and surrounding environment information for a vehicle and select a traffic lane of the road on which the vehicle is traveling, to produce a driving lane plan showing the scheduled driving lane on which the vehicle is to travel,
   determine the notification priority representing the priority for notifying the driver of the planned lane change, based on at least one item from among the scheduled route for the vehicle, and the result of assessing whether or not the planned lane change is included in a plurality of continuous planned lane changes to be executed for a common purpose, when it has been planned to execute a lane change and
   suppress notification to the driver of planned lane changes with low notification priority compared to notification to the driver of planned lane changes with high notification priority, using a notification unit that notifies the driver of information.

2. The vehicle control device according to claim 1, wherein the processor is configured to assess whether or not a planned lane change is a lane change toward the destination of the vehicle, based on the scheduled route produced based on the current location of the vehicle and the destination, and when the planned lane change is not a lane change toward the destination of the vehicle, determine that the notification priority of the planned lane change is lower than the notification priority of a lane change toward the destination of the vehicle.

3. The vehicle control device according to claim 1, wherein the processor is configured to calculate the distance between the location where the planned lane change is expected to be executed and the current location of the vehicle, based on the scheduled route for the vehicle, and when the distance is longer than a reference distance, determine that the notification priority of the planned lane change is lower than the notification priority of a planned lane change within the reference distance from the current location of the vehicle.

4. The vehicle control device according to claim 1, wherein the processor is configured to calculate the required time estimated to be necessary until the planned lane change is executed, based on the current location of the vehicle, the vehicle speed and the scheduled route for the vehicle, and when the required time is longer than a reference time, determine that the notification priority of the planned lane change is lower than the notification priority of a lane change scheduled within the reference time from the current time.

5. The vehicle control device according to claim 1, wherein the processor is configured to assess whether or not one planned lane change is included in a plurality of continuous planned lane changes to be executed for a common purpose, and when the one planned lane change is included in a plurality of continuous planned lane changes to be executed for a common purpose, determine that the notification priority for the plurality of planned lane changes that include the one planned lane change is higher than the notification priority for a planned lane change that is not included in the plurality of continuous planned lane changes to be executed for a common purpose.

6. The vehicle control device according to claim 1, wherein the processor is configured to determine that the notification priority for a planned lane change generated in order to prevent the distance between the vehicle and another object from approaching within a predetermined avoidance distance, is lower than the notification priority for a planned lane change generated based on the scheduled route that includes the current location of the vehicle and the destination.

7. The vehicle control device according to claim 1, wherein the processor suppressing notification to the driver when lane changes with low notification priority have been planned compared to when lane changes with high notification priority have been planned, includes notifying the driver in a manner with reduced noticeability for causing the driver to recognize the notification, when lane changes with low notification priority have been planned compared to when lane changes with high notification priority have been planned.

8. The vehicle control device according to claim 1, wherein the processor suppressing notification to the driver when lane changes with low notification priority have been planned compared to when lane changes with high notification priority have been planned, includes not notifying the driver when lane changes with low notification priority have been planned, and notifying the driver when lane changes with high notification priority have been planned.

9. The vehicle control device according to claim 1, wherein the processor suppressing notification to the driver when lane changes with low notification priority have been planned compared to when lane changes with high notification priority have been planned, includes making the notification period for notifying the driver when lane changes with low notification priority have been planned, longer than the notification period for notifying the driver when lane changes with high notification priority have been planned.

10. A computer-readable non-transitory storage medium that stores a computer program for vehicle control, wherein the computer program causes a processor to
    assess whether or not a lane change is necessary based on a scheduled route and surrounding environment information for a vehicle and select a traffic lane of the road on which the vehicle is traveling, to produce a driving lane plan showing the scheduled driving lane on which the vehicle is to travel,
    determine the notification priority representing the priority for notifying the driver of the planned lane change, based on at least one item from among the scheduled route for the vehicle, and the result of assessing whether or not the planned lane change is included in a plurality of continuous planned lane changes to be executed for a common purpose, when it has been planned to execute a lane change and suppress notification to the driver of planned lane changes with low notification priority compared to notification to the driver of planned lane changes with high notification priority, using a notification unit that notifies the driver of information.

\* \* \* \* \*